United States Patent
Harris, Jr. et al.

(10) Patent No.: US 10,630,802 B2
(45) Date of Patent: Apr. 21, 2020

(54) READ CACHING IN PPRC ENVIRONMENTS

(71) Applicant: International Business Machines Corporation, Armonk, NY (US)

(72) Inventors: Theodore T. Harris, Jr., Tucson, AZ (US); Gregory E. McBride, Vail, AZ (US); Richard A. Welp, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 14/960,731

(22) Filed: Dec. 7, 2015

(65) Prior Publication Data

US 2017/0161349 A1    Jun. 8, 2017

(51) Int. Cl.
*G06F 16/00* (2019.01)
*H04L 29/08* (2006.01)
*G06F 12/0868* (2016.01)
*G06F 12/08* (2016.01)
*G06F 11/20* (2006.01)

(52) U.S. Cl.
CPC ...... *H04L 67/2842* (2013.01); *G06F 11/2069* (2013.01); *G06F 12/08* (2013.01); *G06F 12/0868* (2013.01); *G06F 11/2071* (2013.01); *G06F 2212/1024* (2013.01); *G06F 2212/1032* (2013.01); *G06F 2212/154* (2013.01); *G06F 2212/163* (2013.01); *G06F 2212/286* (2013.01); *G06F 2212/313* (2013.01)

(58) Field of Classification Search
CPC .. G06F 11/2056; G06F 11/2069; G06F 12/08; G06F 12/0868; G06F 11/2071; G06F 2212/1024; G06F 2212/1032; G06F 2212/154; G06F 2212/163; G06F 2212/286; G06F 2212/313; H04L 67/2842
See application file for complete search history.

(56) References Cited

U.S. PATENT DOCUMENTS

| | | | |
|---|---|---|---|
| 8,812,899 B1 | 8/2014 | Fultz et al. | |
| 2003/0212864 A1* | 11/2003 | Hicken | G06F 11/2092 711/122 |
| 2004/0153719 A1* | 8/2004 | Achiwa | G06F 11/2041 714/6.32 |
| 2005/0027892 A1* | 2/2005 | McCabe | G06F 3/0626 709/253 |

(Continued)

*Primary Examiner* — Taelor Kim
*Assistant Examiner* — Lahcen Ennaji
(74) *Attorney, Agent, or Firm* — Nelson and Nelson; Daniel P. Nelson; Alexis V. Nelson

(57) ABSTRACT

A method for caching reads in a data replication environment is disclosed. In one embodiment, such a method includes receiving a read request at a primary site of a data replication environment. The method executes the read request at the primary site. In the event data associated with the read request is not already cached at the primary site, the method stores the data in cache at the primary site. The method also notifies a secondary site of the read request at the primary site. This notification may be sent synchronously or asynchronously as time and resources allow. In the event the data is not already cached at the secondary site, the method stores the data in cache at the secondary site. A corresponding system and computer program product are also disclosed.

17 Claims, 5 Drawing Sheets

(56) References Cited

U.S. PATENT DOCUMENTS

| | | | |
|---|---|---|---|
| 2006/0031647 A1* | 2/2006 | Hirakawa | G06F 11/2074 |
| | | | 711/162 |
| 2008/0005288 A1* | 1/2008 | Kodama | G06F 11/2069 |
| | | | 709/220 |
| 2008/0270694 A1* | 10/2008 | Patterson | G06F 3/0617 |
| | | | 711/114 |
| 2010/0306234 A1* | 12/2010 | Wang | 704/769 |
| 2011/0145189 A1* | 6/2011 | Zheng | H04L 67/1097 |
| | | | 707/620 |
| 2013/0080723 A1* | 3/2013 | Sawa | G06F 3/0607 |
| | | | 711/162 |
| 2013/0185329 A1* | 7/2013 | Bartolome Rodrigo | 707/770 |
| 2014/0229676 A1 | 8/2014 | Biswas et al. | |

\* cited by examiner

READ CACHING IN PPRC ENVIRONMENTS

BACKGROUND

Field of the Invention

This invention relates to systems and methods for caching reads in data replication environments.

Background of the Invention

In data replication environments such as Peer-to-Peer-Remote-Copy ("PPRC") environments, data is mirrored from a primary storage device to a secondary storage device to maintain two consistent copies of the data. The primary and secondary storage devices may be located at different sites, perhaps hundreds or even thousands of miles away from one another. In the event the primary storage device fails, I/O may be redirected to the secondary storage device, thereby enabling continuous operations. When the primary storage device is repaired, I/O may be redirected back to the former primary storage device. The process of redirecting I/O from the primary storage device to the secondary storage device when a failure or other event occurs may be referred to as a swap or HyperSwap.

HyperSwap is a function provided by IBM's z/OS operating system that provides continuous availability for disk failures by maintaining synchronous copies of primary disk volumes on one or more secondary storage controllers. When a disk failure is detected at a primary site, a host system running the z/OS operating system identifies HyperSwap managed volumes. Instead of rejecting I/O requests, the host system uses the HyperSwap function to switch (or swap) information in internal control blocks so that I/O requests are driven against synchronous copies at the secondary site. Since the secondary volumes are identical copies of the primary volumes prior to the failure, the I/O requests will ideally succeed with minimal impact (i.e., delay in I/O response times) on the issuing applications. Unfortunately, although secondary volumes may contain identical copies of data in the primary volumes, the cache at the secondary site may not be populated with the same data as cache at the primary site. This may cause a decrease in performance when swapping from primary volumes to secondary volumes, at least until cache at the secondary site can be fully populated with data.

In view of the foregoing, what are needed are systems and methods to ensure that cache at a secondary site is populated like cache at a primary site. Ideally, such systems and methods will ensure that, after a swap has occurred, I/O performance at a secondary site will mirror as much as possible I/O performance at a primary site.

SUMMARY

The invention has been developed in response to the present state of the art and, in particular, in response to the problems and needs in the art that have not yet been fully solved by currently available systems and methods. Accordingly, the invention has been developed to provide systems and methods for caching reads in data replication environments such as Peer-to-Peer-Remote-Copy ("PPRC") environments. The features and advantages of the invention will become more fully apparent from the following description and appended claims, or may be learned by practice of the invention as set forth hereinafter.

Consistent with the foregoing, a method for caching reads in a data replication environment is disclosed herein. In one embodiment, such a method includes receiving a read request at a primary site of a data replication environment. The method executes the read request at the primary site. In the event data associated with the read request is not already cached at the primary site, the method stores the data in cache at the primary site. The method also notifies a secondary site of the read request at the primary site. This notification may be sent synchronously or asynchronously as time and resources allow. In the event the data is not already cached at the secondary site, the method stores the data in cache at the secondary site.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
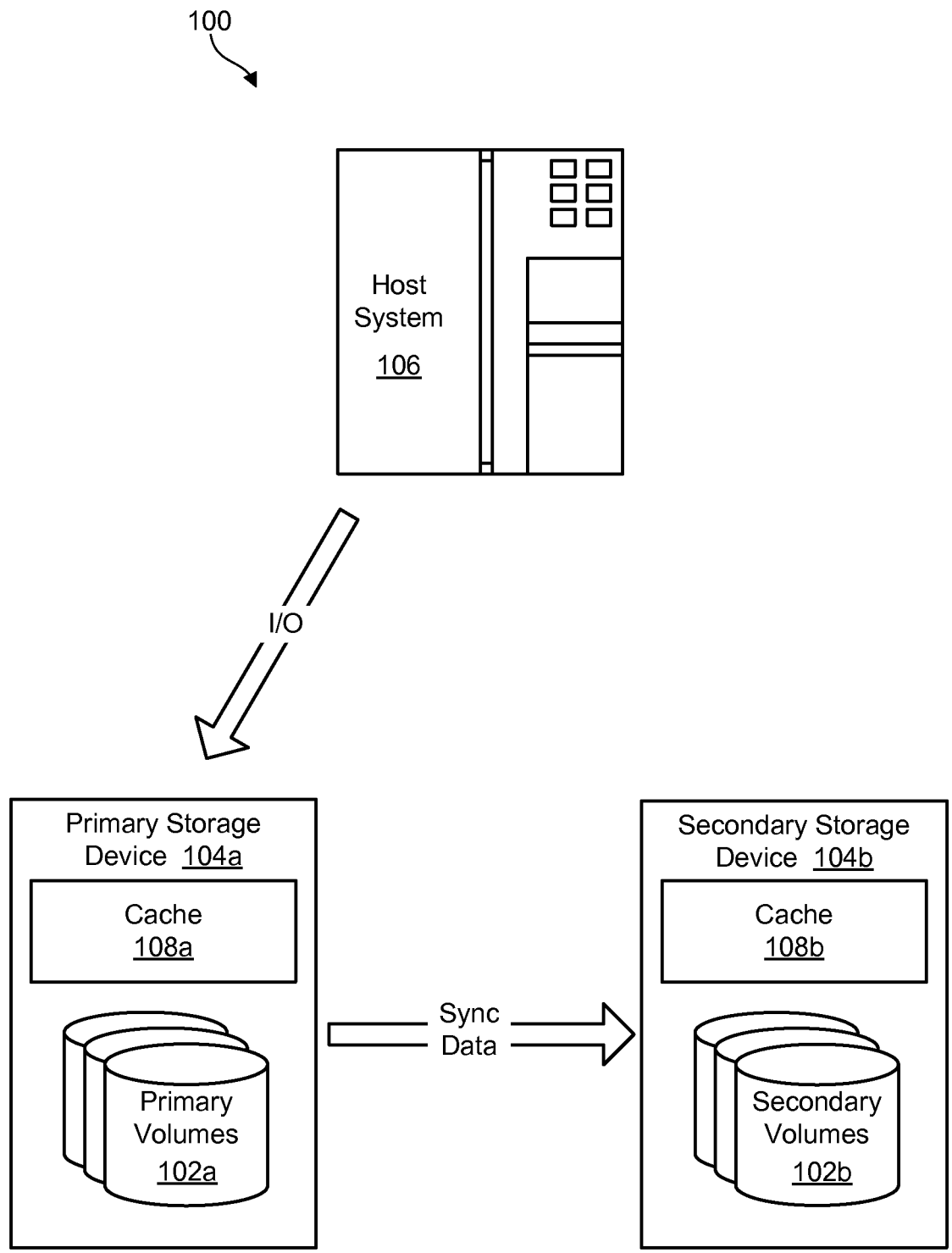
FIG. 1 is a high-level block diagram showing one example of a Peer-to-Peer-Remote-Copy ("PPRC") environment.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one example of a data replication system 100, in this embodiment a PPRC system 100, is illustrated. The PPRC system 100 is presented to show an example of an architecture in which embodiments of the invention may operate, and is not intended to be limiting. In general, the PPRC system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage device 104, although the volumes 102a, 102b are typically located on separate storage devices 104a, 104b located some distance (e.g., several miles to thousands of miles) from one another. Channel extension equipment may be located between the storage devices 104a, 104b, as needed, to extend the distance over which the storage devices 104a, 104b may communicate.

The data replication system 100 may, in certain embodiments, be configured to operate in either a synchronous or asynchronous manner. For example, referring to FIG. 3, while continuing to refer generally to FIG. 1, when operating synchronously, an I/O may only be considered complete when it has completed successfully on both the primary and secondary storage devices 104a, 104b. As an example, in such a configuration, a host system 106 may initially send a write request 300 to the primary storage device 104a. This write operation may be performed on the primary storage device 104a. The primary storage device 104a may, in turn, transmit a write request 302 to the secondary storage device 104b. The secondary storage device 104b may execute the write operation and return a write acknowledge signal 304 to the primary storage device 104a. Once the write has been performed on both the primary and secondary storage devices 104a, 104b, the primary storage device 104a returns a write acknowledge signal 306 to the host system 106. The I/O is only considered complete when the host 106 receives the write acknowledge signal.

By contrast, asynchronous operation may only require that the write complete on the primary storage device 104a before the write is considered complete. That is, a write acknowledgement may be returned to the host system 106 when the write has completed on the primary storage device 104a, without requiring that the write also be completed on the secondary storage device 104b. The write may then be mirrored to the secondary storage device 104b as time and resources allow to create a consistent copy on the secondary storage device 104b.

Referring again to FIG. 1, as shown, each of the primary storage device 104a and secondary storage device 104b may include cache 108a, 108b. Whenever a storage device 104 receives a read request from a host system 106, the storage device 104 may first check its cache 108 to determine whether the requested data is stored therein. If so, the storage device 104 may retrieve the data from its cache 108 and return it to the host system 106. If the data is not stored in its cache 108, the storage device 104 may fetch the data from its volumes 102 (typically disk and/or solid state drives), return the data to the host system 106, and save it in its cache 108 in the event it is requested again. If the data is requested again by a host 106, the storage device 104 may fetch the data from its cache 108 instead of fetching it from its volumes 102, saving both time and resources.

In a similar manner, when a storage device 104 receives a write request, the storage device 104 may store the write in its cache 108 and destage the write to its volumes 102 at a later time. The write may be considered complete when it is written to its cache 108 as opposed to when it is destaged to its volumes 102. In general, the cache 108 may accelerate reads and writes and generally enhance I/O performance.

Figure 2:
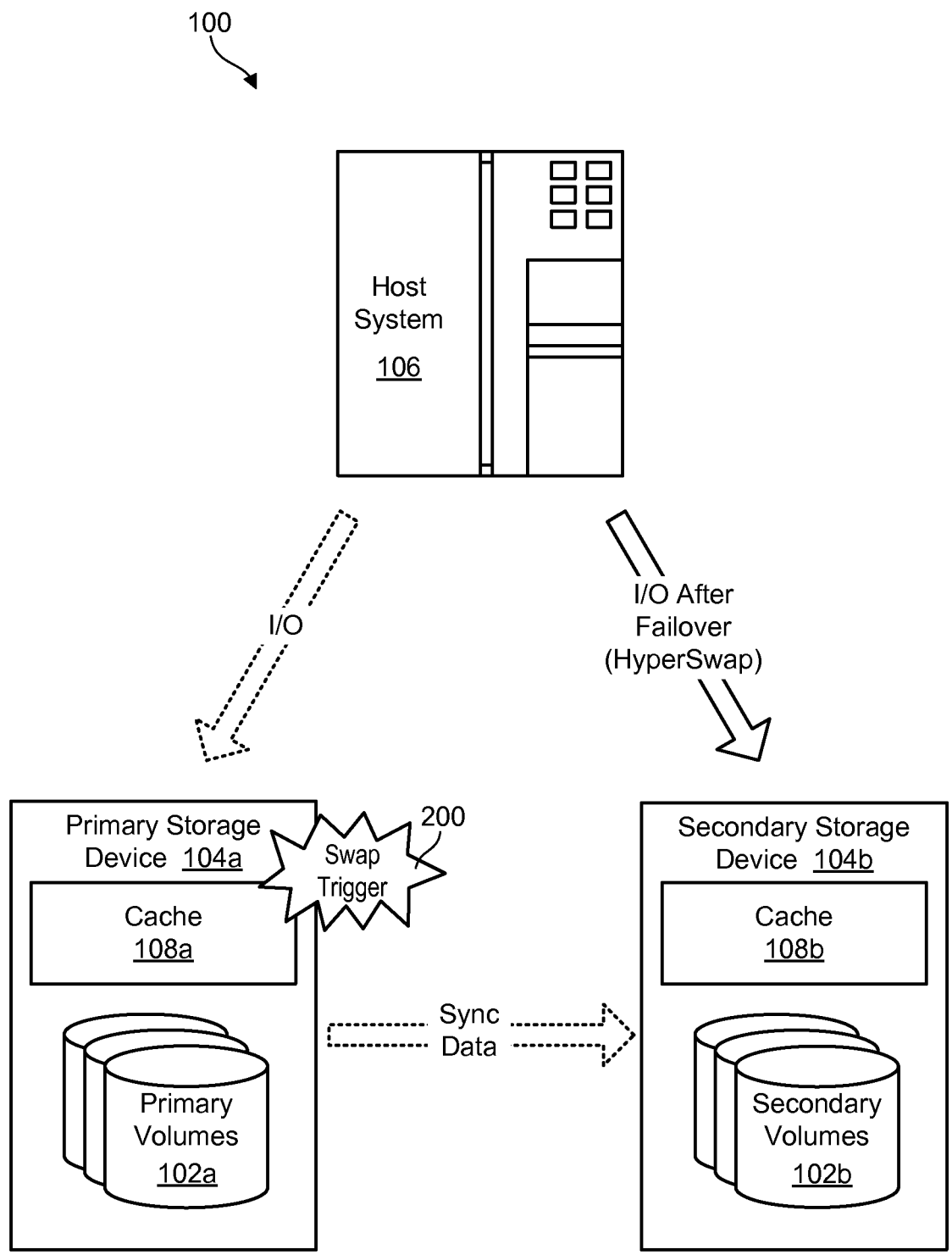
FIG. 2 is a high-level block diagram showing behavior of the system of FIG. 1 after a swap trigger.

Referring to FIG. 2, in the event the primary storage device 104a fails, I/O may be redirected to the secondary storage device 104b, thereby enabling continuous operations. This process may be referred to as a swap or HyperSwap. Since the secondary storage device 104b contains a consistent copy of the data on the primary storage device 104a, the redirected I/O (e.g., reads and writes) may be performed on the copy of the data on the secondary storage device 104b. When the primary storage device 104a is repaired or resumes operation, mirroring may be restarted in the opposite direction to make device 104b the new primary storage device and device 104a the new secondary storage device.

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

As previously mentioned, HyperSwap is a function provided by IBM's z/OS operating system that provides continuous availability for disk failures by maintaining synchronous copies of data on primary disk volumes 102a on secondary disk volumes 102b. When a disk failure is detected at a primary site 104a, a host system 106 running the z/OS operating system identifies HyperSwap-managed volumes 102a at the primary site 104a. Instead of rejecting I/O requests, the host system 106 uses the HyperSwap function to switch (or swap) information in internal control blocks so that I/O requests are driven against synchronous copies at the secondary site 104b, as shown in FIG. 2. Such an operation may also be referred to as a "failover." Since the secondary volumes 102b contain identical copies of data in the primary volumes 102a prior to the failure, the I/O requests will ideally succeed with minimal (i.e. a slight delay in I/O response time) impact on the issuing applications. This functionality masks disk failures from applications and ideally avoids application or system outages. An event which initiates a HyperSwap may be referred to as a "swap trigger" 200.

Figure 3:
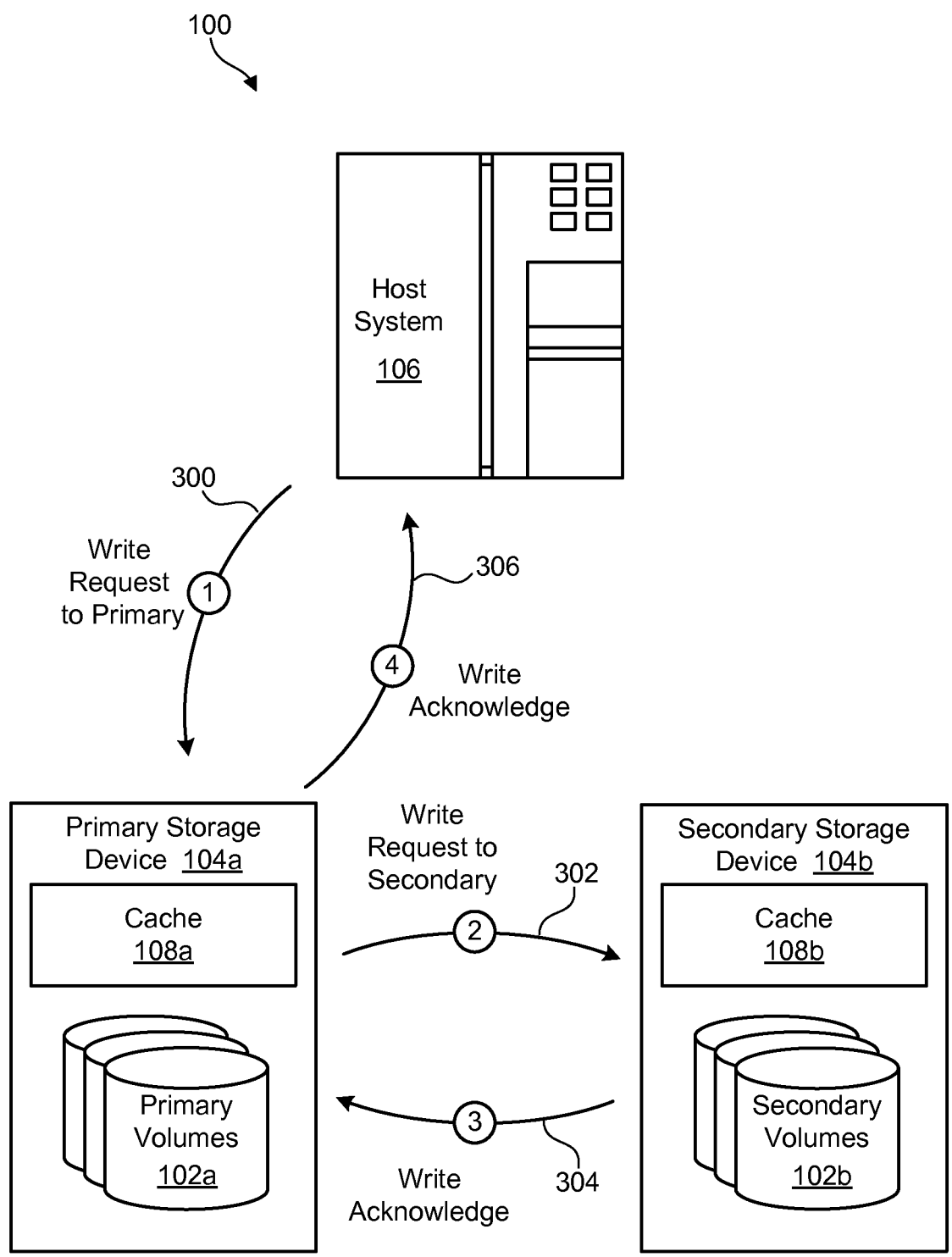
FIG. 3 is a high-level block diagram showing processing of a write request in the system of FIG. 1.
Figure 4:
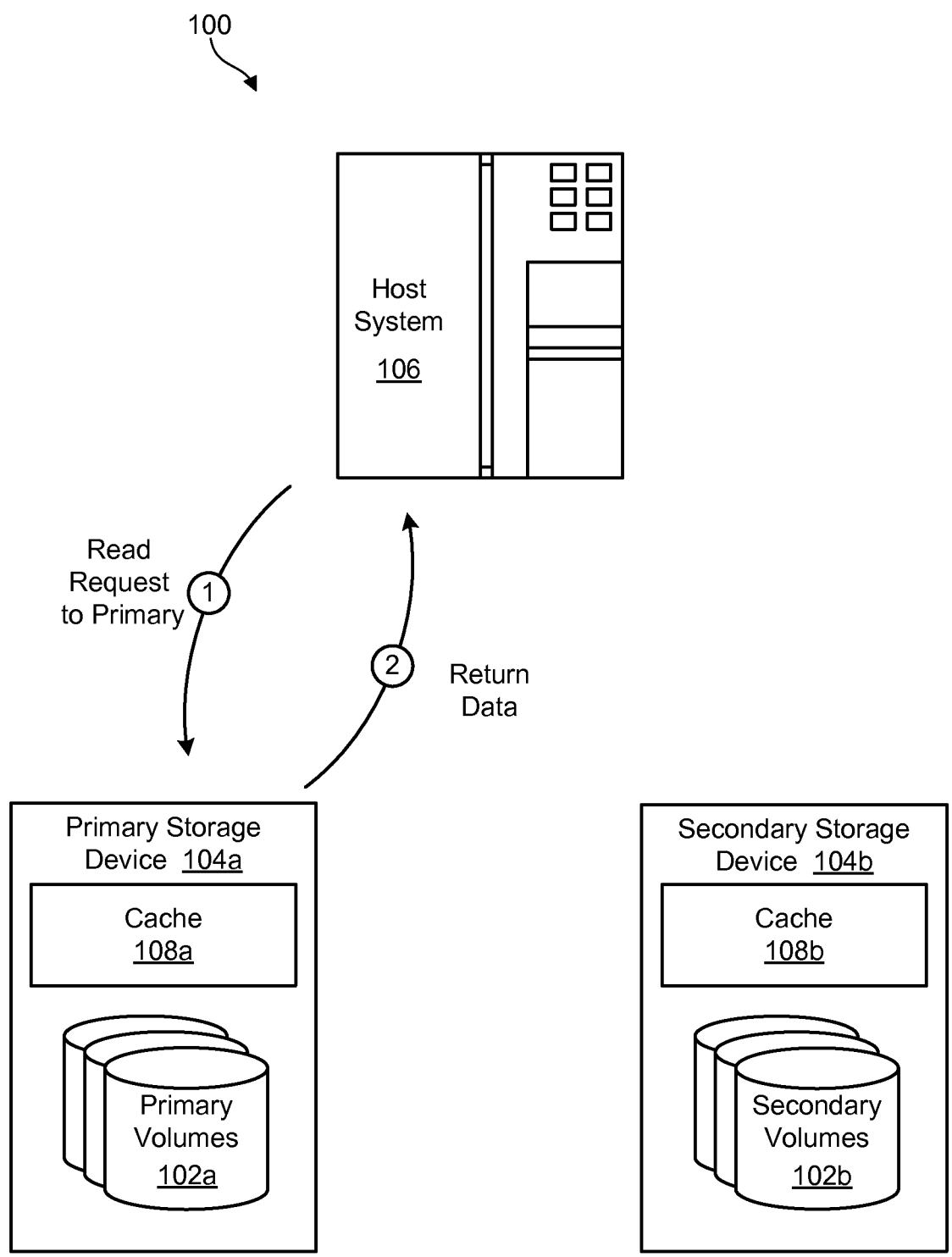
FIG. 4 is a high-level block diagram showing conventional processing of a read request in the system of FIG. 1.

Referring to FIGS. 3 and 4, unfortunately, in conventional PPRC systems 100, I/O performance before and after a HyperSwap event may not be equivalent. This may be in large part due to the way that cache 108 is populated in conventional PRRC systems. For example, as shown in FIG. 3, during normal PPRC operation, writes may be mirrored from the primary storage device 104a to the secondary storage device 104b. This allows the writes to be cached not only in the cache 108a of the primary storage device 104a, but also in the cache 108b of the secondary storage device 104b. However, as shown in FIG. 4, reads may be performed exclusively at the primary storage device 104a since no data is modified and thus there is no need to replicate changes to the secondary storage device 104b. Because read requests are typically not propagated to the secondary storage device 104b, cache 108b at the secondary storage device 104b may not be populated with reads in the same way as cache 108a at the primary storage device 104a. The data that is stored in each cache 108a, 108b may vary significantly, particularly in PPRC systems 100 with high read workloads.

The result of this variation may be evident what a HyperSwap event occurs. In particular, I/O performance may decrease when I/O is redirected to the secondary storage device 104b since the cache 108b at the secondary site is not populated with the same data as cache 108a at the primary site. The I/O performance may remain impaired until the cache 108b at the secondary site can be populated to reflect the actual read and write workload originating from the host system 106. The cache 108b at the secondary storage device 104b may gradually be populated as read and write requests are received from the host system 106, but may nevertheless result in decreased I/O performance in the interim, which may be on the order of hours or days.

Figure 5:
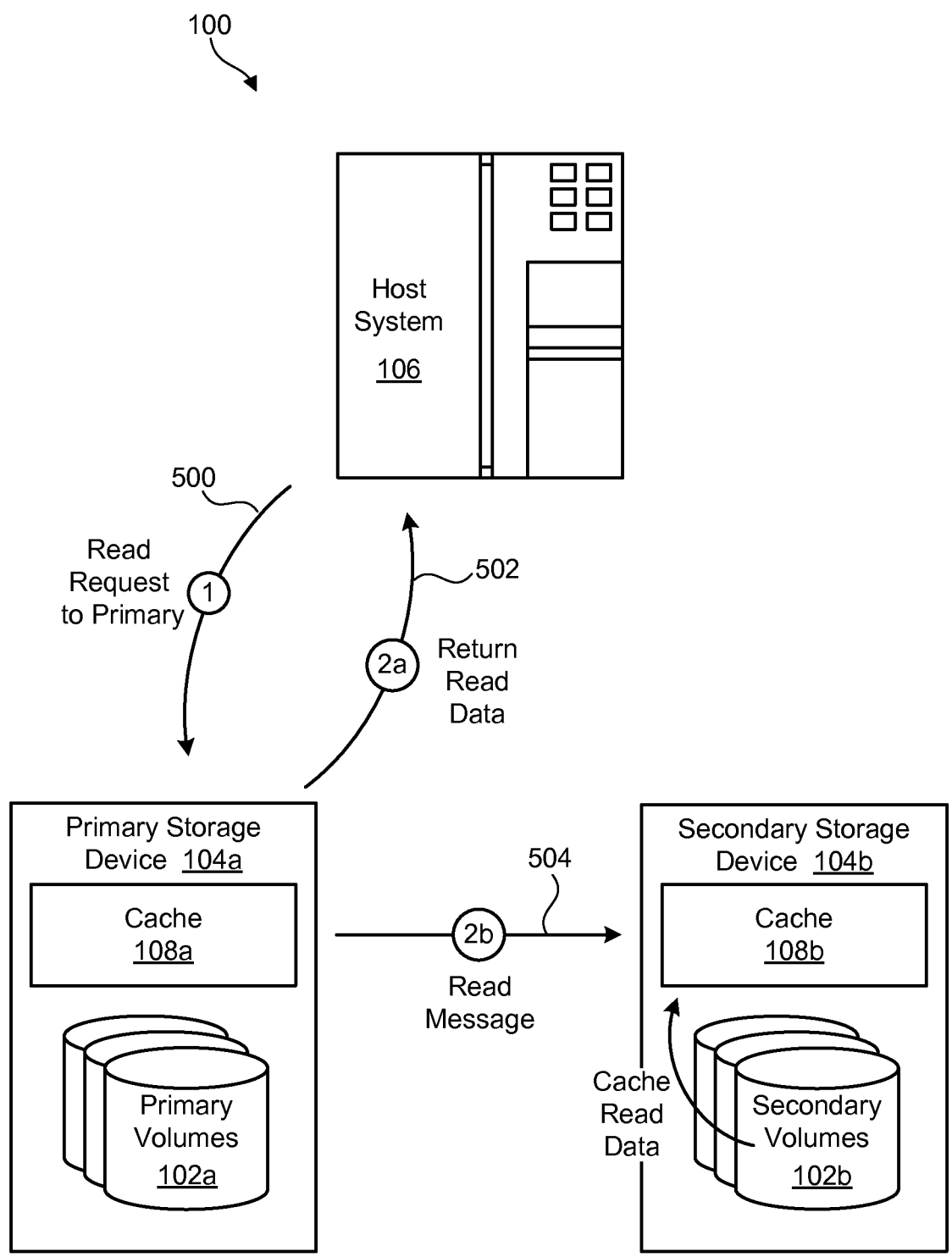
FIG. 5 is a high-level block diagram showing an improved technique for processing a read request in the system of FIG. 1.

Referring to FIG. 5, in order to address the deficiencies identified above, systems and methods in accordance with the invention may provide functionality to ensure that cache 108a, 108b at the primary and secondary sites are substantially synchronized. As shown in FIG. 5, in certain embodiments, when read requests are received at a primary storage device 104a, the read requests or information associated with the read requests (hereinafter referred to as "read messages 504") may be transmitted to the secondary storage device 104b. This will allow the secondary storage device 104b to retrieve data associated with the read requests from its secondary volumes 102b and store it in cache 108b. Alternatively, data associated with the read requests may be mirrored from the primary storage device 104a to the secondary storage device 104b, thereby allowing the secondary storage device 104b to directly store the data in its cache 108b, as opposed to having to fetch the data from its secondary volumes 102b. If the data is already in cache 108b, the secondary storage device 104b may ignore the read requests or update a timestamp or other timing information associated with the read data to prevent or control the timing when the read data will be evicted from cache 108b. In this way, data will not be evicted from cache 108b at the secondary site substantially earlier than the corresponding data at the primary site.

In certain embodiments, a read message 504 may be transmitted from the primary storage device 104a to the secondary storage device 104b immediately after a read request 500 is received from the host system 106. In such embodiments, reads and writes may be received and transmitted to the secondary storage device 104b in the order they are received from a host system 106. In other embodiments, read messages 504 may be sent asynchronously to the secondary storage device 104b as time and resources allow. For example, read messages 504 may be transmitted to the secondary storage device 104b during periods of reduced I/O so as not to compete with critical I/O. The read messages 504 may be sent as separate messages or, in certain embodiments, packaged together as a batch to improve efficiency. In certain embodiments, the read messages 504 are sent through the same "in band" PPRC communication path as other I/O (write requests, etc.), although this is not necessary. In other embodiments, the read messages 504 are transmitted through an "out-of-band" communication channel.

In certain embodiments, a read message 504 is transmitted to the secondary storage device 104b without requiring a response (e.g., acknowledgement) from the secondary storage device 104b that the read message was received and processed. This is because a missed read will not cause data integrity issues. This will also prevent or reduce latency or overhead that may be caused by waiting for an acknowledgement. A single or small number of missed read messages 504 at the secondary storage device 104b will result in a minimal amount of I/O performance degradation in the event of a HyperSwap. Nevertheless, in other embodiments, the secondary storage device 104b may be configured to return an acknowledgement or other response to the primary storage device 104a or host system 106 upon receiving and processing a read message 504.

Although particular reference has been made herein to synchronous PPRC, the systems and methods disclosed herein may be equally applicable to asynchronous data replication systems 100, such as Extended Remote Copy, or XRC. Such systems, for example, may asynchronously mirror data from a primary storage device 104a to a secondary storage device 104b. The systems and methods disclosed herein may ensure that the cache 108 of such storage device 104a, 104b are synchronized as much as possible, thereby providing consistent I/O performance in the event of a HyperSwap or similar event. Because the read messages may be mirrored asynchronously from the primary storage device 104a to the secondary storage device 104b, the systems and methods disclosed herein may be readily adapted to asynchronous data replication systems 100.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for caching reads in a data replication environment, the method comprising:

receiving a read request at a primary storage device of a data replication environment;

executing the read request at the primary storage device by returning data associated with the read request to an originator of the read request;

in the event the data associated with the read request is not already cached at the primary storage device, storing the data in cache at the primary storage device;

transmitting the read request from the primary storage device to a secondary storage device of the data replication environment to enable the secondary storage device to observe read traffic that is occurring at the primary storage device and populate its cache in a manner that reflects the read traffic that is occurring at the primary storage device, without returning any data associated with the read request to any location external to the secondary storage device; and in response to receiving the read request at the secondary storage device and determining that the data is not already cached at the secondary storage device, storing the data in the cache at the secondary storage device without returning the data associated with the read request from the secondary storage device to any location external to the secondary storage device.

2. The method of claim 1, wherein transmitting the read request from the primary storage device to the secondary storage device further comprises transmitting the read request from the primary storage device to the secondary storage device without requiring an acknowledgement from the secondary storage device that the secondary storage device has processed the read request.

3. The method of claim 1, wherein transmitting the read request from the primary storage device to the secondary storage device comprises transmitting the read request to the secondary storage device in the order that it is received at the primary storage device.

4. The method of claim 1, wherein the data replication environment is a synchronous data replication environment.

5. The method of claim 4, wherein transmitting the read request from the primary storage device to the secondary storage device comprises asynchronously transmitting the read request from the primary storage device to the secondary storage device.

6. The method of claim 1, further comprising, upon failing over from the primary storage device to the secondary storage device, reading the data from the cache at the secondary storage device.

7. A computer program product for caching reads in a data replication environment, the computer program product comprising a computer-readable medium having computer-usable program code embodied therein, the computer-usable program code comprising:

computer-usable program code to receive a read request at a primary storage device of a data replication environment;

computer-usable program code to execute the read request at the primary storage device by returning data associated with the read request to an originator of the read request;

computer-usable program code to, in the event the data associated with the read request is not already cached at the primary storage device, store the data in cache at the primary storage device;

computer-usable program code to transmit the read request from the primary storage device to a secondary storage device of the data replication environment to enable the secondary storage device to observe read traffic that is occurring at the primary storage device and populate its cache in a manner that reflects the read traffic that is occurring at the primary storage device, without returning any data associated with the read request to any location external to the secondary storage device; and computer-usable program code to, in response to receiving the read request at the secondary storage device and determining that the data is not already cached at the secondary storage device, store the data in the cache at the secondary storage device without returning the data associated with the read request from the secondary storage device to any location external to the secondary storage device.

8. The computer program product of claim 7, wherein transmitting the read request from the primary storage device to the secondary storage device further comprises transmitting the read request from the primary storage device to the secondary storage device without requiring an acknowledgement from the secondary storage device that the secondary storage device has processed the read request.

9. The computer program product of claim 7, wherein transmitting the read request from the primary storage device to the secondary storage device comprises transmitting the read request to the secondary storage device in the order that it is received at the primary storage device.

10. The computer program product of claim 7, wherein the data replication environment is a synchronous data replication environment.

11. The computer program product of claim 10, wherein transmitting the read request from the primary storage device to the secondary storage device comprises asynchronously transmitting the read request from the primary storage device to the secondary storage device.

12. The computer program product of claim 7, further comprising computer-usable program code to, upon failing over from the primary storage device to the secondary storage device, read the data from the cache at the secondary storage device.

13. A system for caching reads in a data replication environment, the system comprising:

a data replication environment comprising a primary storage device, storing a primary copy of data, and a secondary storage device, storing a replicated copy of the data;

the primary storage device configured to receive and execute a read request by returning data associated with the read request to an originator of the read request;

the primary storage device further configured to, in the event the data associated with the read request is not already cached at the primary storage device, store the data in cache at the primary storage device;

the primary storage device further configured to transmit the read request from the primary storage device to a secondary storage device of the data replication environment to enable the secondary storage device to observe read traffic that is occurring at the primary storage device and populate its cache in a manner that reflects the read traffic that is occurring at the primary storage device, without returning any data associated with the read request to any location external to the secondary storage device; and the secondary storage device configured to, in response to receiving the read request and determining that the data is not already cached at the secondary storage device, store the data in the cache at the secondary storage device without returning the data associated with the read request from the secondary storage device to any location external to the secondary storage device.

14. The system of claim 13, wherein the primary storage device is further configured to transmit the read request from the primary storage device to the secondary storage device without requiring an acknowledgement from the secondary storage device that the secondary storage device has processed the read request.

15. The system of claim 13, wherein the primary storage device is further configured to transmit the read request to the secondary storage device in the order that it is received at the primary storage device.

16. The system of claim 13, wherein the data replication environment is a synchronous data replication environment.

17. The system of claim 16, wherein the primary storage device is further configured to asynchronously transmit the read request from the primary storage device to the secondary storage device.

* * * * *